United States Patent
Boelen et al.

(10) Patent No.: US 9,341,799 B2
(45) Date of Patent: May 17, 2016

(54) FIBER OPTIC ASSEMBLY AND MODULAR TRAY THEREFORE

(71) Applicant: GENIA PHOTONICS INC., Laval (CA)

(72) Inventors: Johannes Sander Boelen, Hudson (CA); Francois-Xavier Bertrand, Murdochville (CA); Bryan Burgoyne, Montreal (CA); Alexandre Dupuis, Montreal (CA); Isabelle Gelinas, Laval (CA)

(73) Assignee: GENiA PHOTONiCS iNC., Laval, QC ( * ) Notice: Subject to any disclaimer, the term of this patent is extended or adjusted under 35 U.S.C. 154(b) by 85 days.

(21) Appl. No.: 14/381,694

(22) PCT Filed: Feb. 28, 2013

(86) PCT No.: PCT/CA2013/050146
§ 371 (c)(1),
(2) Date: Aug. 28, 2014

(87) PCT Pub. No.: WO2013/127012
PCT Pub. Date: Sep. 6, 2013

(65) Prior Publication Data
US 2015/0023645 A1    Jan. 22, 2015

Related U.S. Application Data

(60) Provisional application No. 61/604,331, filed on Feb. 28, 2012.

(51) Int. Cl.
*G02B 6/44* (2006.01)

(52) U.S. Cl.
CPC ............ *G02B 6/4452* (2013.01); *G02B 6/4455* (2013.01); *G02B 6/4457* (2013.01)

(58) Field of Classification Search
CPC ...... G02B 6/44; G02B 6/4452; G02B 6/4453; G02B 6/4455; G02B 6/4457
See application file for complete search history.

(56) References Cited

U.S. PATENT DOCUMENTS

| 4,792,203 A | 12/1988 | Nelson et al. |
| 5,302,140 A | 4/1994 | Arnett |

(Continued)

FOREIGN PATENT DOCUMENTS

| EP | 0730177 A2 | 9/1996 |
| WO | 2004/110122 A2 | 12/2004 |

(Continued)

OTHER PUBLICATIONS

Richco Inc, "Fiber Management : OFST—Optical Fiber Splice Tr",Catalog, Retrived from Internet on Feb. 21, 2013 http://www.richco-inc.com/products/fiber-management/106-fiber-management-catalog.html?.

(Continued)

*Primary Examiner* — Michelle R Connelly
*Assistant Examiner* — Hoang Tran
(74) *Attorney, Agent, or Firm* — Norton Rose Fulbright Canada LLP; Alexandre Dacust

(57) ABSTRACT

The fiber optic assembly can include two fiber optic breadboards hinged to one another along a coinciding hinge axis. Each one of the fiber optic breadboards can have a flat body having two faces and lateral edges, one of which running alongside the hinge axis, and can have a tessellation of tray locations each having a tray attachment. The fiber optic assembly can also include a plurality of fiber optic trays each having a body having a base attachable to at least one of said tray attachments, the body having a size and shape associated to one of a single one of said tray locations and a plurality of adjacent ones of said tray locations on one of said at least one fiber optic breadboards, and having a structure by which an optical fiber having a critical radius of curvature can be confined within at least one optical fiber path.

22 Claims, 11 Drawing Sheets

(56) References Cited

U.S. PATENT DOCUMENTS

| | | | |
|---|---|---|---|
| 5,323,478 | A | 6/1994 | Milanowski et al. |
| 5,668,910 | A | 9/1997 | Arnett |
| 5,740,299 | A | 4/1998 | Llewellyn et al. |
| 5,778,131 | A | 7/1998 | Llewellyn et al. |
| 5,825,558 | A * | 10/1998 | Farmiga ............ G02B 7/00 359/813 |
| 6,535,682 | B1 | 3/2003 | Puetz et al. |
| 6,736,521 | B1 | 5/2004 | Turner |
| 7,613,377 | B2 | 11/2009 | Gonzales et al. |
| 2010/0202740 | A1 * | 8/2010 | Barlowe ............ G02B 6/4471 385/100 |
| 2011/0211800 | A1 | 9/2011 | Cooke et al. |
| 2013/0214662 | A1 * | 8/2013 | Pimentel ............ G02B 6/4452 312/330.1 |

FOREIGN PATENT DOCUMENTS

| | | |
|---|---|---|
| WO | 2007/072137 A2 | 6/2007 |
| WO | 2009/106874 A1 | 9/2009 |

OTHER PUBLICATIONS

Richco Inc, "Fiber Management : EFA04-25-001—Fiber Array Tr",Catalog, Retrived from Internet on Feb. 21, 2013 http://www.richco-inc.com/products/fiber-management/106-fiber-management-catalog.html?.

* cited by examiner

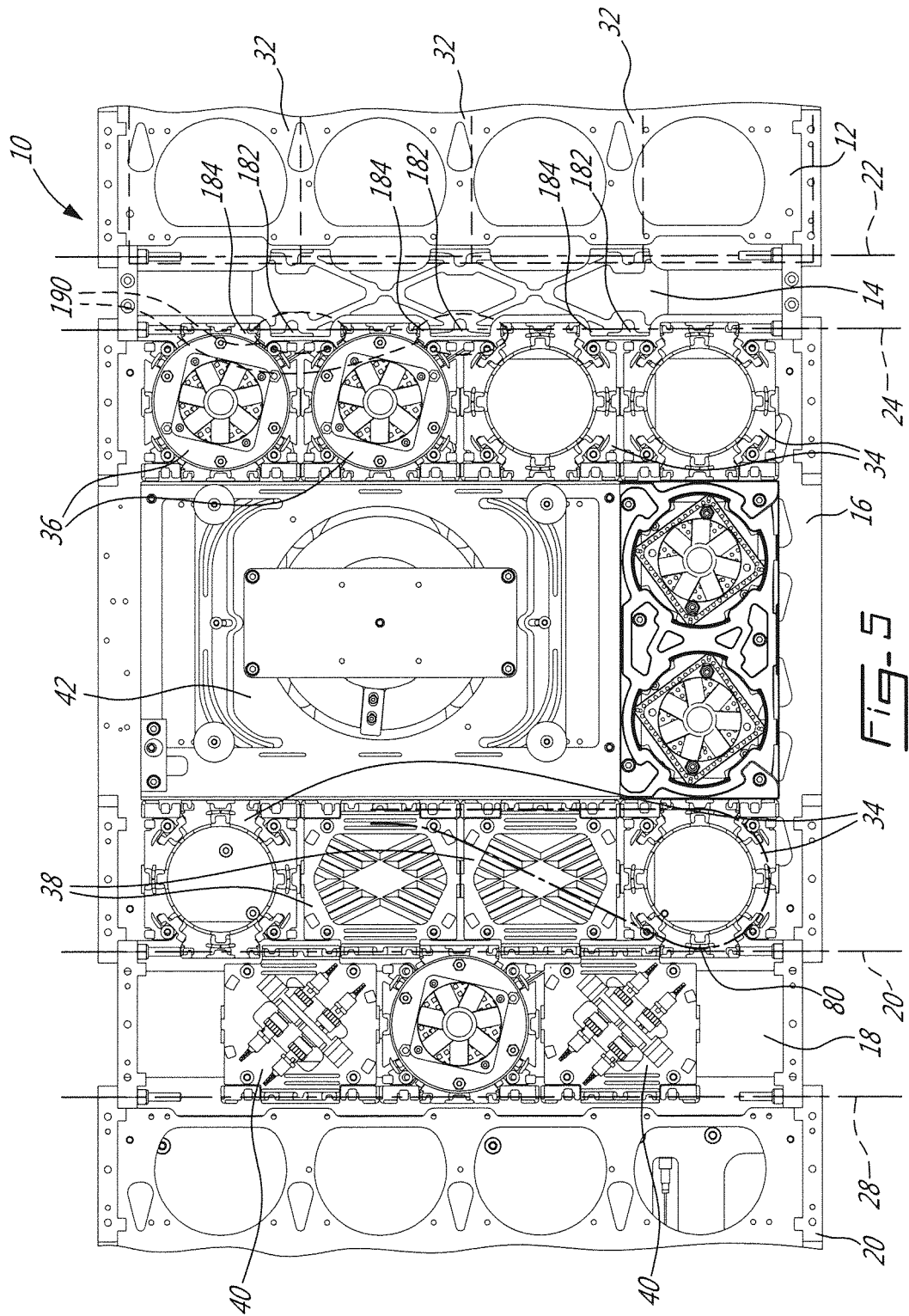

FIBER OPTIC ASSEMBLY AND MODULAR TRAY THEREFORE

FIELD

The improvements generally relate to the field of fiber optic assemblies, and more particularly to modular components which can be used in creating a customized assembly.

BACKGROUND

Fiber optic assemblies such as fiber lasers often require a significant amount of fiber optic components and electronic components. For instance, a typical fiber laser typically requires at least one laser diode, optical fiber, and electronics to drive the laser diode. In complex assemblies, the mere physical organization of all these components can represent a challenging puzzle, especially when everything must be condensed into a compact volume during operation. Furthermore, troubleshooting such a complex custom fiber assembly can require significant time, especially when it is necessary disassemble some components to have access to other components.

The patent publication WO/2011/150522 filed under the Patent Cooperation Treaty, describes an assembly in which optical components can be mounted on a plurality of breadboards mounted to a common hinge. This latter publication addresses the above identified concerns to a certain extent. Nonetheless, there remained room for improvement.

SUMMARY

In accordance with one aspect, there is provided a fiber optic assembly comprising: at least one fiber optic breadboard having a body in the form of a sheet having a first face opposite a second face, at least the first face having a tessellation of tray locations, said tray locations each having a same polygonal shape having a plurality of edges, at least one of the edges of each tray location coinciding at least partially with an edge of an adjacent one of the tray locations, a same size, and a tray attachment; and a plurality of fiber optic trays each having a size and shape associated to one of a single one of said tray locations and a plurality of adjacent ones of said tray locations, said fiber optic trays including a first fiber optic tray and a second fiber optic tray attached adjacent to each other at corresponding tray locations via corresponding ones of said tray attachments and having at least one optical fiber path extending from the first fiber optic tray and the second fiber optic tray, each fiber optic tray having a structure forming a corresponding portion of said at least one optical fiber path, by which an optical fiber having a critical radius of curvature can be confined within said at least one optical fiber path, said at least one optical fiber path having a radius of curvature which remains above the critical radius of curvature along an entire length of the at least one optical fiber path.

In accordance with another aspect, there is provided a fiber optic assembly comprising: at least one a fiber optic breadboard, each fiber optic breadboard having a body having a first face opposite a second face, and having two opposite lateral edges; a first lateral hinge attachment made integral to the body, the first lateral hinge attachment having a first hinge axis extending along a first one of the two opposite lateral edges of the body; a second lateral hinge attachment made integral to the body, the second lateral hinge attachment having a second hinge axis extending along a second one of the two opposite lateral edges of the body; and a structure made integral to the body, on the first face thereof, by which an optical fiber having a critical radius of curvature can be confined within at least one optical fiber path, said at least one optical fiber path extending between a first portion parallel and coinciding with the hinge axis of a first one of the two lateral hinge attachments and a second portion parallel and coinciding with the hinge axis of a second one of the two lateral hinge attachments, said at least one optical fiber path having a radius of curvature which remains above the critical radius of curvature along an entire length of the at least one optical fiber path.

In accordance with another aspect, there is provided a fiber optic tray for use with a fiber optic assembly including at least two fiber optic breadboards each having a flat body having two faces and lateral edges, the at least two fiber optic breadboards being hingedly mounted to one another via at least one coinciding hinge axis running along corresponding ones of the lateral edges, at least one of the fiber optic breadboards having a tessellation of rectangular tray locations each having a tray attachment adapted to receive the fiber optic tray; said fiber optic tray comprising a body having a base attachable to at least one of said tray attachments, said body having a size and shape associated to one of a single one of said tray locations and a plurality of adjacent ones of said tray locations on one of said at least one fiber optic breadboards; the body having four edges associated with corresponding edges of the at least one tray location, and a structure integral to the body, opposite the base, by which an optical fiber having a critical radius of curvature can be confined within at least one optical fiber path, the at least one optical fiber path not exceeding the critical radius of curvature at any portion along its length, the at least one optical fiber path including at least a first straight optical fiber path extending along a first one of the four edges; the body further having at least one detachable portion extending along a first one of the four edges, the at least one detachable portion bearing a portion of the structure forming the first straight optical fiber path and extending along at least half of the dimension of the first edge.

Many further features and combinations thereof concerning the present improvements will appear to those skilled in the art following a reading of the instant disclosure.

DESCRIPTION OF THE FIGURES

In the figures,

FIG. 5 is a plan view, enlarged and fragmented of a portion of the first face of the fiber optic assembly in an unfolded configuration;

DETAILED DESCRIPTION

Figure 1:
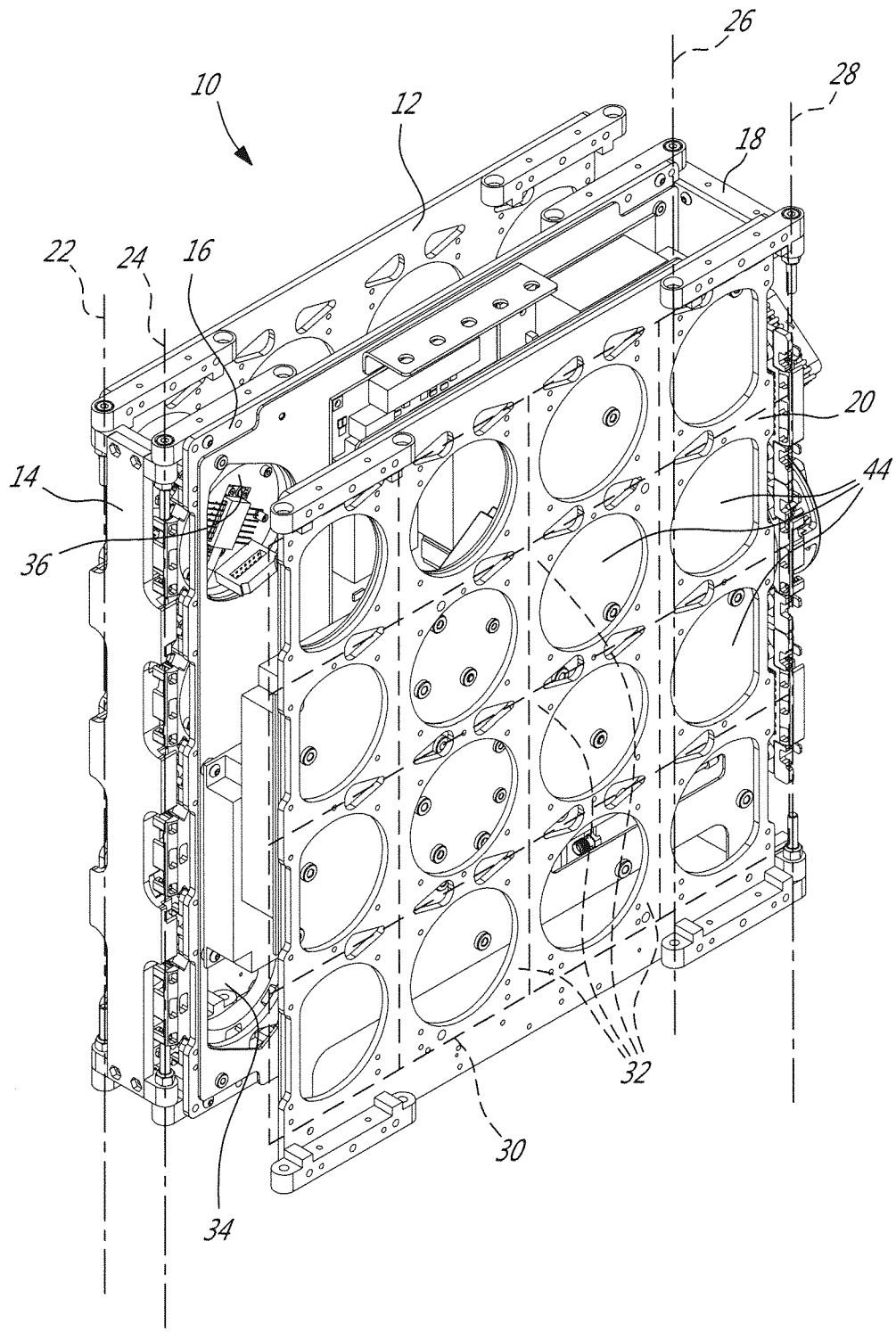
FIG. 1 is an oblique view of an example of a fiber optic assembly in a folded configuration.

FIG. 1 shows an example of a fiber optic assembly 10 having a plurality of fiber optic breadboards 12, 14, 16, 18, 20 hinged sequentially to one another about a series of parallel hinge axes 22, 24, 26, 28. The fiber optic assembly 10 uses a modular system where the fiber optic breadboards 12, 16, 18, 20 are provided in the form of hinged pages each having a tessellation 30, or array, of tray locations 32, to which a plurality of fiber optic trays 34, 36, 38, 40, 42 which can have various optical functions can be mounted. The fiber optic assembly 10 can be folded into the configuration shown in FIG. 1, and unfolded into the configuration shown in FIGS. 2 and 3. Moreover, each of the tray locations 32 on the fiber optic breadboards 12, 16, 18, 20 are provided with apertures 44, which allows mounting fiber optic components on one side or face 46 (shown in FIG. 2), mounting electronic components on the other side of face 48 (FIG. 3), and connecting the electronics to the optics across the apertures 44. In the unfolded state (FIGS. 2 and 3), the optics and the electronics are both readily accessible, on corresponding faces 46, 48 of the fiber optic assembly 10.

Figure 4:
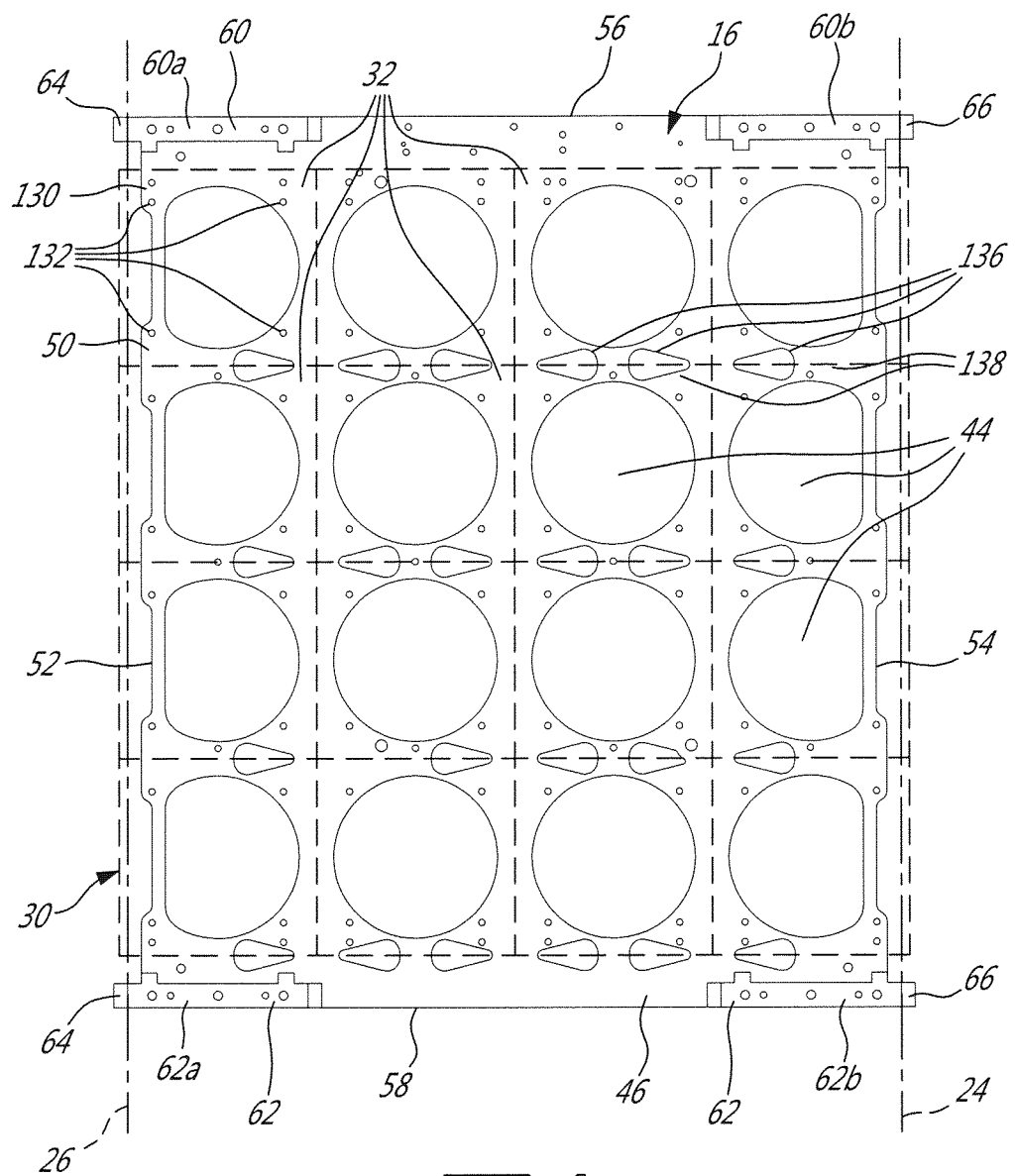
FIG. 4 is plan view of a fiber optic breadboard of the fiber optic assembly.

FIG. 4 shows the fiber optic breadboard 16 of the fiber optic assembly 10 without any optics nor electronics mounted to it. It can be seen that this fiber optic breadboard 16 has body 50 generally in the form of a sheet having a tessellation 30 of tray locations 32. In this particular embodiment, the tray locations 32 are square and all have the same (edge) dimensions, and the tessellation 30 is made of a square 4×4 array of these square tray locations 32, totalling 16 square tray locations 32. The tray locations 32 can be said to constitute a tessellation 30 in the sense that no free space is left between adjacent tray locations 32, which allows optical fiber to pass from one tray location to another while being quasi-continuously supported, and confined, by a structure which is provided as part of the fiber optic trays 34, 36, 38, 40, as will be described in fuller detail below. The fiber optic breadboards 12 and 20 have identical bodies to the body 50.

The sheet-like body 50 of the fiber optic breadboard 16 can be said to have two opposite faces, only the first one of which can be seen in FIG. 4. The body 50 has two opposite edges which will be referred to herein as a first lateral edge 52 and a second lateral edge 54, and two opposite edges which will be referred to herein as an upper edge 56 and a lower edge 58, for the sake of simplicity, independently of their actual orientation during operation of the assembly 10. A header 60 and a footer 62 are provided on the upper edge 56 and lower edge 58, respectively. Both the header 60 and the footer 62 are provided in the form of two separate hinge components 60a, 60b, 62a, 62b which are all secured to the sheet-like body 50, in this particular embodiment. A first lateral hinge 64 is formed by the combination of the two hinge components 60a, 62a which are provided on at the first lateral edge 52 of the header 60 and the footer 62, and a second lateral hinge 66 is formed by the combination of the two hinge components 60b, 62b which are provided on the second lateral edge 54 of the header 60 and the footer 62. Each one of the first lateral hinge 64 and the second lateral hinge 64 are associated to a respective hinge axis 26, 24, about which the fiber optic breadboard 16 will be allowed to pivot relative to an adjacent fiber optic breadboard (18, 14) as will be described further below. It will be noted that the tray locations 44 which are on lateral edges 52, 54 of the sheet-like body 50 actually exceed the corresponding lateral edges 52, 54 of the body, a characteristic which is related to hinging the fiber optic breadboards to one another while allowing an optical fiber path to extend therebetween, as will be detailed further below.

Figure 2:
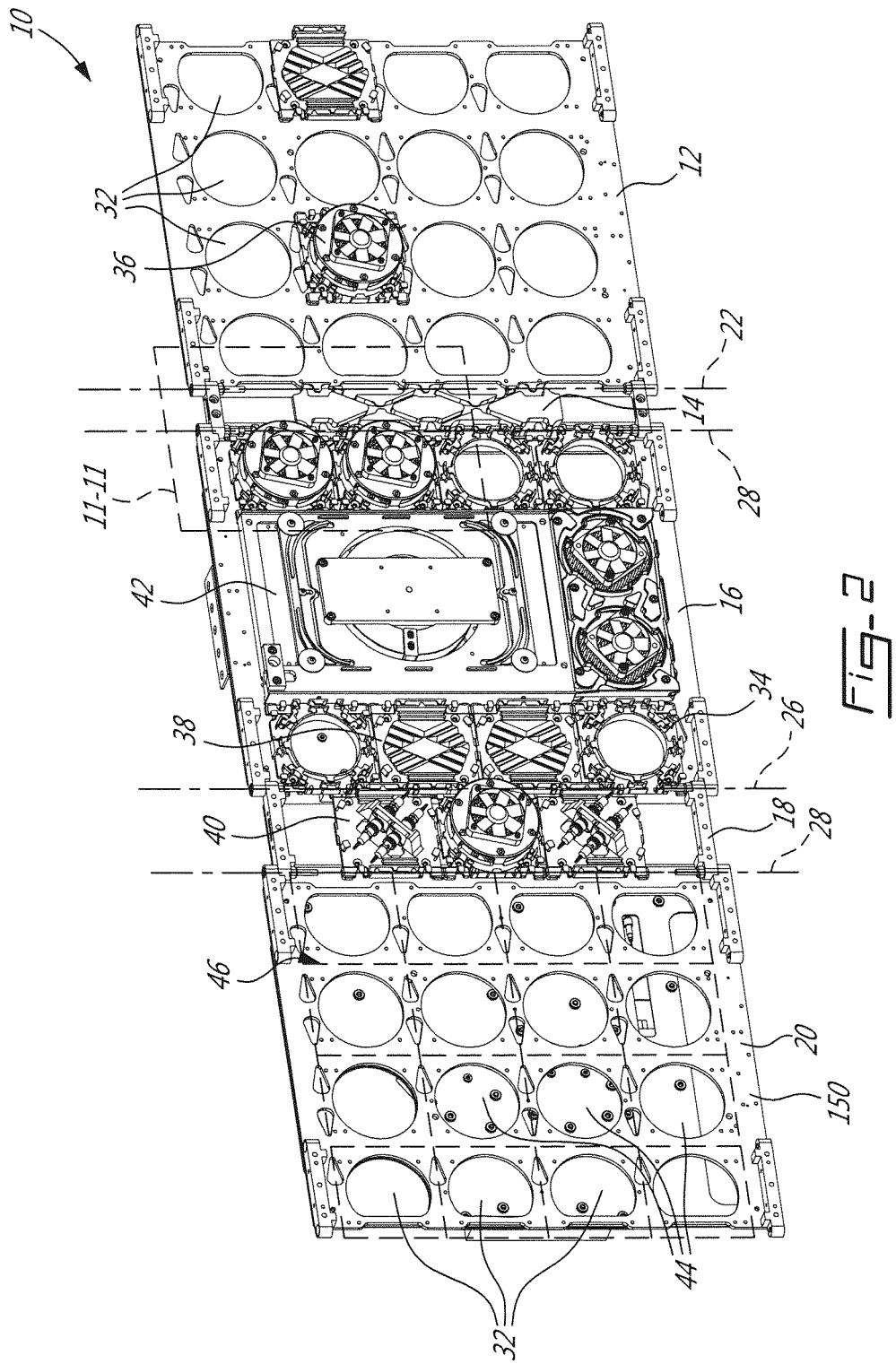
FIG. 2 is an oblique view showing a first face of the fiber optic assembly in an unfolded configuration.

FIGS. 2 and 5 shows the fiber optic breadboard 16 assembled to other fiber optic breadboards 12, 14, 18, 20 in a sequentially hinged manner, and onto which fiber optic trays 34, 36, 38, 40, 42 have been assembled to the tray locations. The fiber optic breadboard 16 can be referred to as the third fiber optic breadboard 16 herein, as it is the third fiber optic breadboard 16 in the hinge sequence. Although there are various tray types which are shown, which carry out corresponding functions in the final fiber optic assembly 10, it can be seen that the trays 34, 36, 38, 40, 42 all have a shape and size which either correspond to a single one of the tray location units 32 (and does not exceed or protrude from the tray location unit to which it is mounted), or to a plurality of adjacent ones of the tray location units 32 (i.e. an integer multiple of the tray location units).

In this particular assembly 10, eight of the trays (identified by numerals 34, 36 and 38 on FIG. 5) on the third fiber optic breadboard 16 have a shape and size which correspond to that of a single tray location 32. These single tray location trays 34, 36, 38, which will be referred to hereinafter as 'unitary' trays, include four spool trays 34, two laser diode tray 36, and two fiber optic component trays 38. Another type of unitary tray is also shown on the second fiber optic breadboard 18, immediately adjacent the third fiber optic breadboard 16. This unitary tray is a bulkhead tray 40 which can be used for connecting patch cords. A high power optics tray 42 is also shown assembled to the third fiber optic breadboard 16 in FIGS. 2 and 5. This high power optics tray 42 is provided in the form of a block having dimensions corresponding to a 2×4 array of the tray locations 32, and therefore entirely covers 8 adjacent tray locations 32. This high power optics tray 42 is an example of a tray which covers an integer multiple of adjacent tray locations. In this embodiment, the high power optics tray 42 includes dual high power laser diodes (each associated to a corresponding tray location) and a high power fiber spool (associated to a 2×3 array of adjacent tray locations).

Each one of the unitary trays (34, 36, 38, 40) in this example, whichever their type, has a base 66 which is adapted for mounting to either one of the tray locations 32, and a structure 68 protruding outwardly from the base 66 and forming a plurality of optical fiber path portions (e.g. 72, 74). The structure 68, in these examples, includes of a plurality of walls 70 which protrude outwardly from a flat portion of the base 66, and which cooperate in forming an optical fiber path portion. The walls form lateral limits regularly along the optical fiber path, laterally confining the optical fiber positioned therein. The structure 68 is generally open outwardly from the base, to allow the insertion of optical fiber therein along the optical path portions, but many of the walls are provided with laterally protruding tabs 71 which collectively prevent optical fiber held inside corresponding path portions from exiting from the outward opening in the absence of a manual intervention.

Figure 6A:
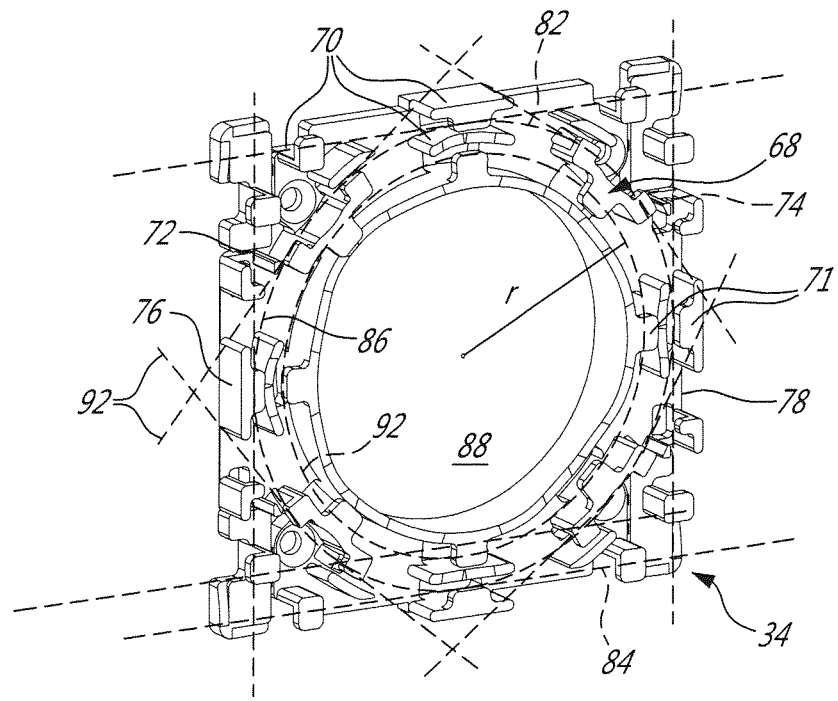
FIGS. 6A and 6B are oblique views showing an outer face and an inner face, respectively, of a spool tray of the fiber optic assembly.

In these examples, each one of the unitary trays has straight optical fiber path portions 72, 74, on two opposite lateral edges 76, 78 of the unitary trays 34, 36, 38, 40 (an example of which is shown in FIG. 6A). Each unitary tray 34, 36, 38, 40 also has additional characteristics which will be described further below.

It is well known in the field that one characteristic of optical fiber is that an optical fiber does not function well in its function of guiding light if it is bent too sharply. More particularly, the radius of bending below which their characteristics deplete is commonly referred to as the "critical radius", and is characteristic both of the optical fiber and of the wavelength(s) of light that it is to convey. Henceforth, the path that the optical fiber will take along a plurality of the trays 34, 36, 38, 40 (an example of such a path 80 being illustrated in FIG. 5) should not, at any point therealong, create a bend which would have a radius of curvature which is inferior to the critical radius. To this end, the optical fiber path portions along which optical fiber can be confined within the trays are intended not only to maintain a radius of curvature above the critical radius within the tray, but also to allow communicating with an optical fiber path portion of an adjacent tray while confining the optical fiber to a radius of curvature which is maintained above the critical radius thereacross. Moreover, a technique is described below which allows to achieve this even when bridging to an adjacent tray across a hinge.

Figure 6B:
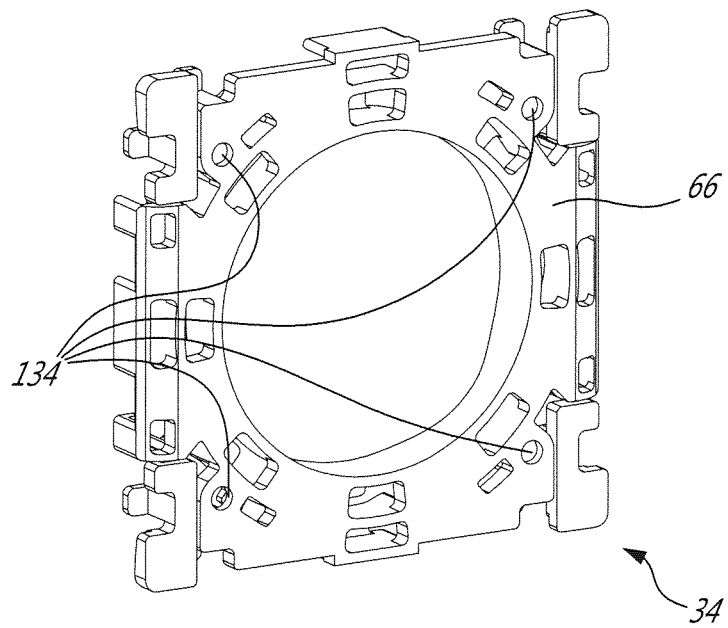
Figure 7A:
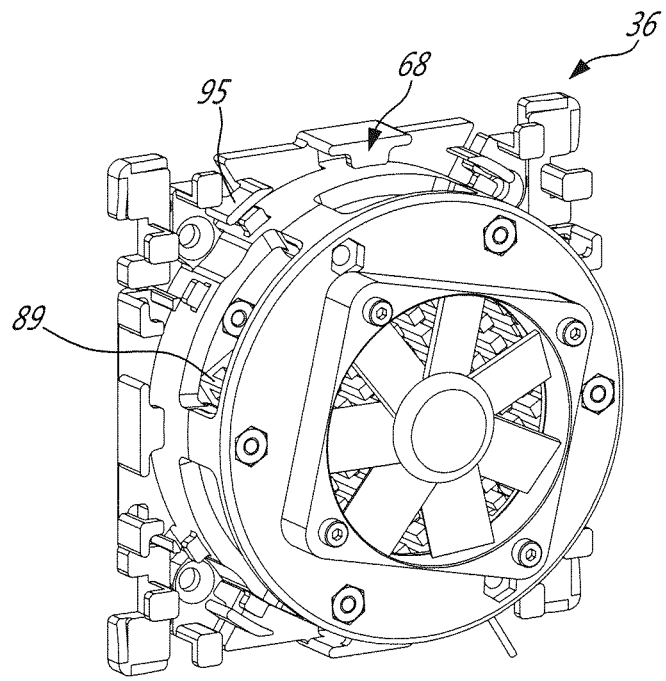
FIGS. 7A and 7B are oblique views showing an outer face and an inner face, respectively, of laser diode tray of the fiber optic assembly.
Figure 7B:
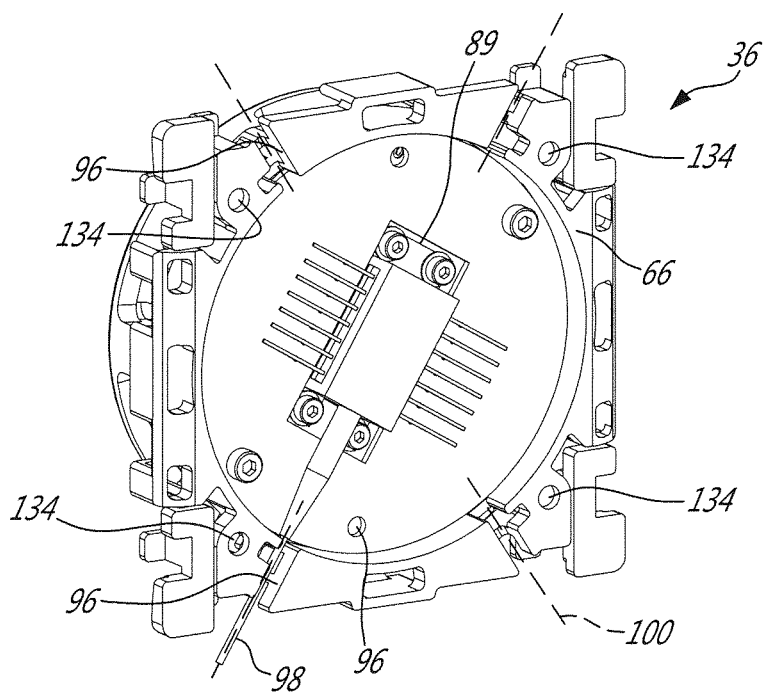

The spool trays 34, an example of which is shown in FIGS. 6A and 6B, and the laser diode trays 36, an example of which is shown in FIGS. 7A and 7B, do not only have two straight optical fiber path portions 72, 74 on opposite lateral edges 76, 78, which are shared by all the unitary trays (34, 36, 38, 40), but further has two additional straight optical fiber paths 82, 84 formed by the structure 68 along the upper and lower edges, allowing to convey an optical fiber straight across the tray at two distinct positions for each one of two orthogonal orientations.

Moreover, both the spool tray 34 and laser diode tray 36 additionally have a circular optical fiber path 86 formed by the structure 68, allowing to smoothly curve the optical fiber conveyed therein from a tangential point of entry to another tangential point of exit. Moreover, in these examples, the structure 68 is engineered for the circular path 86 to tangentially communicate with the straight optical fiber path portions 72, 74, 82, 84 to allow extending the fiber to an adjacent tray along any one of the edges, and is additionally engineered with oblique tangential paths 92 communicating with the circular path 86 to allow extending the fiber obliquely to an adjacent tray across any one of the edges. The connection of the straight optical fiber path portions 72, 74, 82, 84 and the oblique tangential paths 92 with the circular optical fiber path 86 form corresponding tangential points of entry/exit from the circular optical fiber path 86.

In this example, the spool tray 34 shown in FIGS. 6A and 6B is more specialized than the laser diode tray 36 in providing room for coiling a greater length of optical fiber, and is therefore engineered with an additional, inner, circular optical fiber path 94 provided concentric to the circular optical fiber path 86 and communicating therewith across a plurality of openings provided between walls 70 of the structure 68. A relatively large amount of optical fiber can thus be coiled (spun) therein in a manner respecting the critical radius of curvature of the optical fiber. Moreover, the spool tray 34 is provided with a large central aperture 88.

In this example, the laser diode tray 36 shown in FIGS. 7A and 7B is provided with a heat sink 89 and fan mounted thereon, outwardly from the base 66, and a laser diode 90 mounted inwardly of the heat sink 89 and exposed through the base 66. The structure 68 includes bridges 95 extending over obliquely extending gaps 96 provided in the base 66. The laser diode 90 can be configured to inject light into a optical fiber 98, and provided with a portion of the structure 68 which holds an end of the optical fiber 98 in an orientation corresponding with a corresponding one of the obliquely extending gaps 96. Henceforth, oblique optical fiber paths 100 are provided, and the heat sink 89, laser diode 90, bridges 95 and gaps 96 can be considered to form part of the structure 68 which forms the oblique optical fiber paths 100 of the laser diode tray 36. In this example, the orientation of these optical fiber paths 100 is engineered to coincide with the oblique paths 92 of spool tray 34 when positioned at an immediately adjacent tray location 32.

Figure 8A:
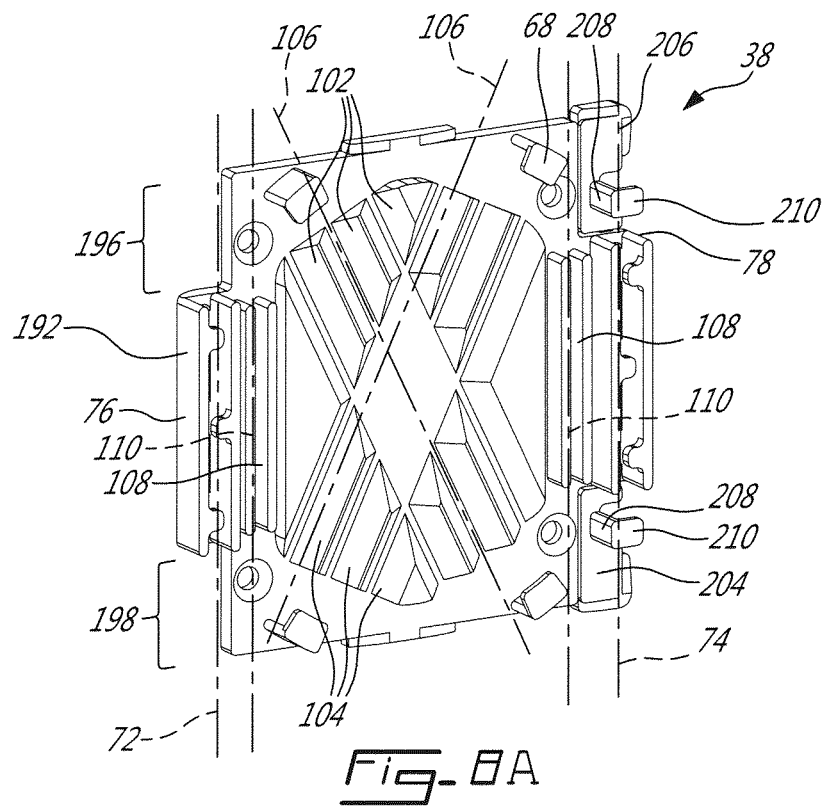
FIGS. 8A and 8B are oblique views showing an outer face and an inner face, respectively, of a fiber optic component tray of the fiber optic assembly.
Figure 8B:
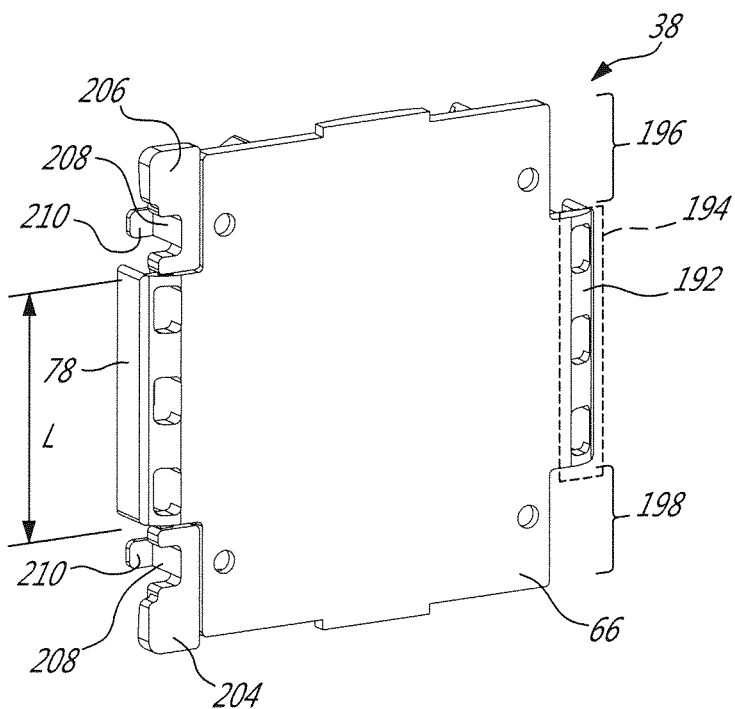

In this example, the fiber optic component tray 36 shown in FIGS. 8A and 8B, incorporates the straight optical fiber path portions 72, 74, described above, like all other example unitary trays illustrated herein. Additionally, the fiber optic component tray 36 has a plurality of fiber optic component holders 102, 104 provided in the form of "V" shaped grooves, extending in any one of two oblique orientations. In this particular example, the fiber optic component holders 102, 104 have a total of 3 V-grooves in each of the two oblique orientations, and each of the V-grooves is adapted to allow holding a fiber optic component such as a tap coupler, an isolator, a circulator, and/or a WDM, to name a few examples. In a manner similar as to how an optical fiber can be held in a given location and orientation relative to a laser diode in the laser diode tray described above, these V-grooves can hold a fiber optic component in a manner that an optical fiber extending therefrom will extend in a given location and a specific oblique orientation corresponding to an oblique optical fiber path portion 106. It will be understood that the specific oblique orientation is engineered, in this example, to coincide with the oblique optical fiber path portion 92 of spool tray 34 when positioned at an immediately adjacent tray location 32 to allow optical fiber to smoothly transfer thereon as schematized in the example optical fiber path 80 shown in FIG. 5. Moreover, the fiber optic component tray 38 is also provided with two splice sleeve holders 108 each splice sleeve holder 108 being provided in the form of two parallel walls with a gap therebetween sized to receive a splice sleeve. Each one of the two splice sleeve holders 108 is provided adjacent and parallel to a corresponding one of the straight optical fiber path portions 72, 74, and also forming an additional, corresponding, optical path 110 as a optical fiber extending from a splice sleeve positioned therein will necessarily do so in a confined location and orientation. As illustrated in the example optical fiber path 80 shown in FIG. 5, both splice sleeve holders 108 are engineered in this case to allow transitioning an optical fiber extending from a splice sleeve held therein smoothly to a corresponding one of the oblique optical fiber paths 102, 104 of an other fiber optic component tray positioned at an immediately adjacent tray location 32, to allow the optical fiber to reach the fiber optic component without bending beyond the critical radius along the transition. Wall with tabs are provided to assist in such a transition. As will be understood from the above, the component holders 102, 104 can be considered to form part of the structure 68 which provides for optical fiber path portions 106, and the splice sleeve holders 108 can be considered to form part of the structure 68 which provides for optical fiber path portions 110.

Figure 9A:
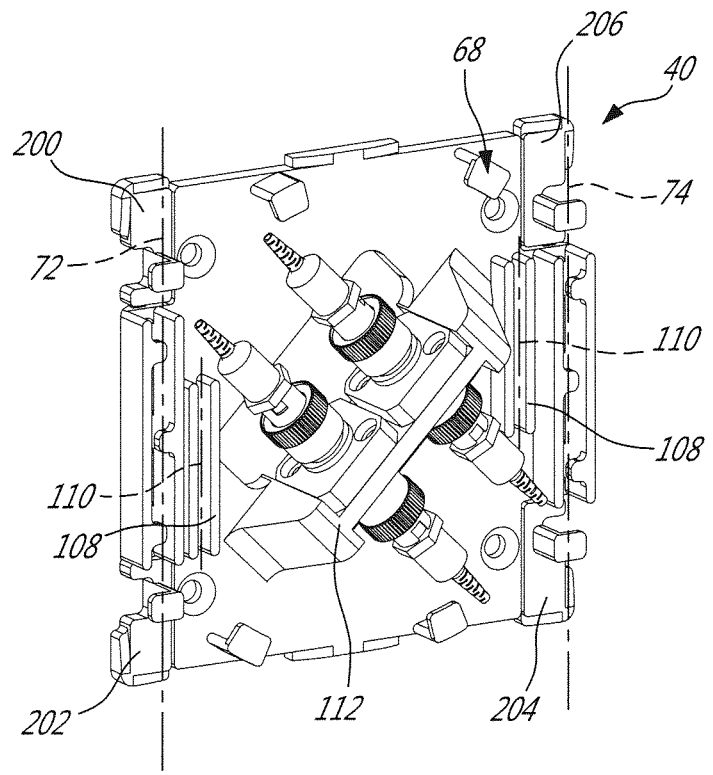
FIGS. 9A and 9B are oblique views showing an outer face and an inner face, respectively, of a bulkhead tray of the fiber optic assembly.
Figure 9B:
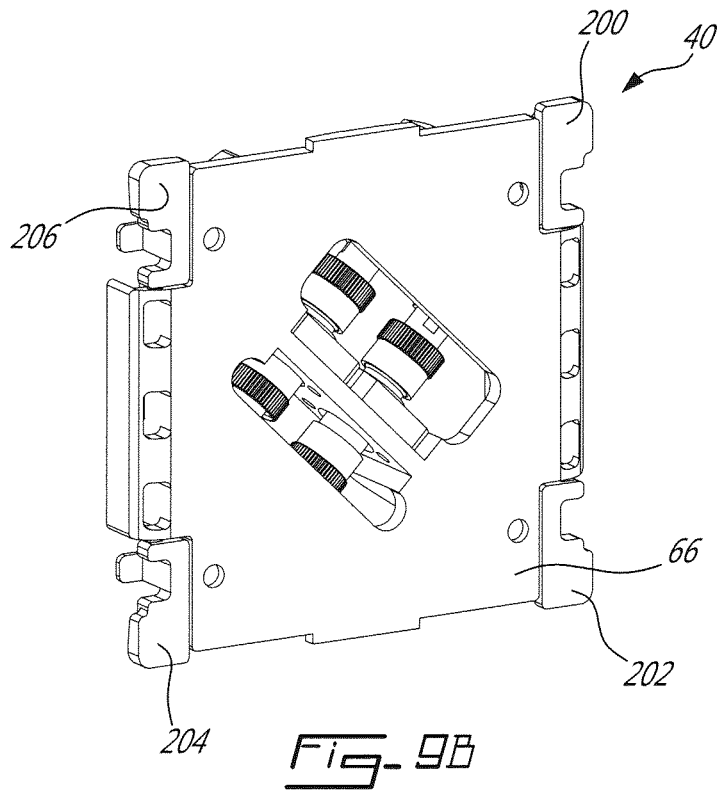

In this example, the bulkhead tray 40 shown on FIGS. 9A and 9B incorporates the straight optical fiber path portions 72, 74, described above, and is further provided with splice sleeve holders 108 and associated optical fiber path portions 110 as described above with reference to the fiber optic component tray 38. Moreover, the bulkhead tray 40 includes a twin patch cord connector 112.

Figure 10A:
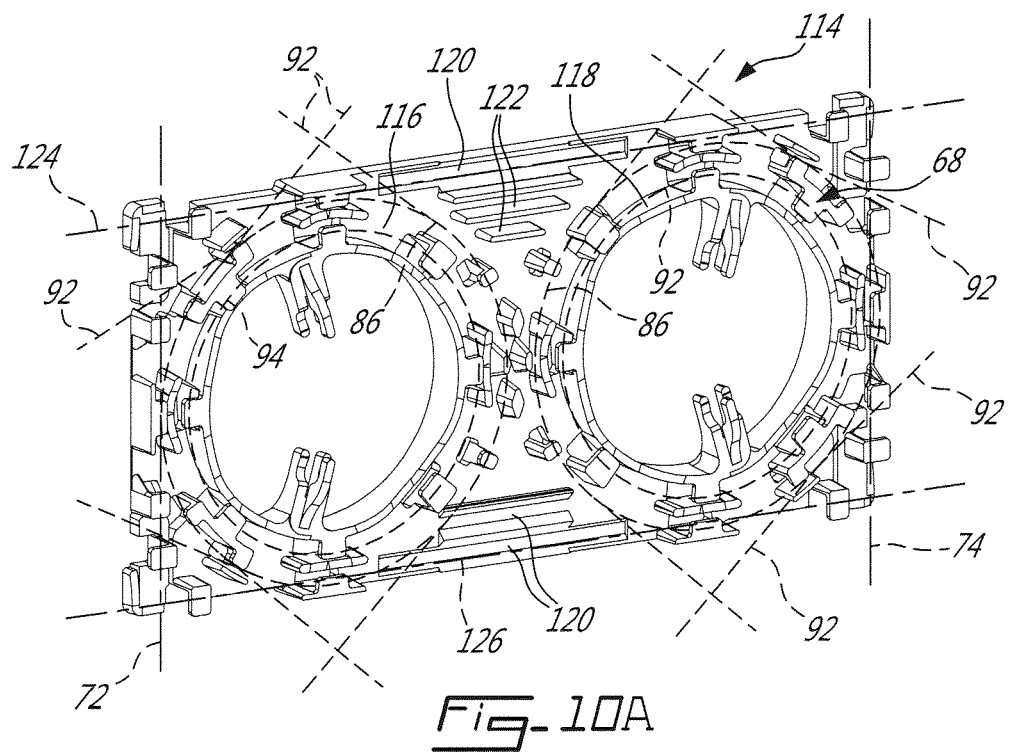
FIGS. 10A and 10B are oblique views showing an outer face and an inner face, respectively, of a double spool tray.
Figure 10B:
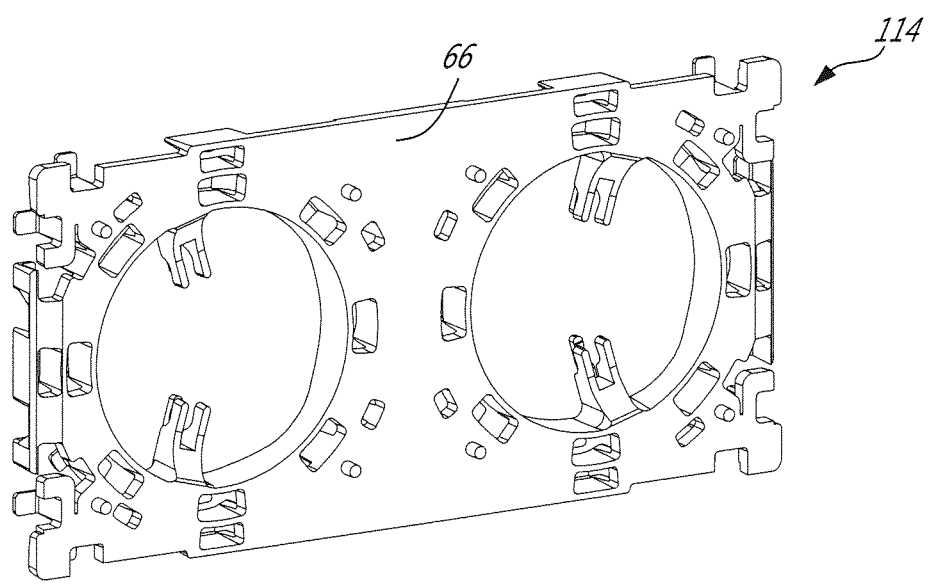

FIGS. 10A and 10B illustrate an example of a double spool tray 114 which has a size and shape associated to two adjacent tray locations 32. The double spool tray 114 which can be seen to include straight path portions 72, 74 such as described above, and to combine two spool structures 116, 118, each bearing many similarities (circular paths 86, 94, oblique paths 92 . . . ) to the one described above with reference to FIG. 6A. Moreover, the double spool tray 114 includes a combined upper straight path 124 and a combined lower straight path 126, each extending across the tray and coinciding with a circular path 86 of both spools. Furthermore, the double spool tray 114 is provided with fiber optic component holders 120 provided in the form of V-grooves, and splice holders 122, in a manner similar to comparable components described above.

Referring back to FIG. 4, it can be understood that reducing the dimensions of the tray locations 32 can be interesting, because it could allow to have a greater number of tray locations (and therefore a greater number of trays) on a fiber optic breadboard having a same given dimension. However, certain features pose a practical limit to how small the trays, and henceforth the tray locations, can be made. For instance, when considering a tray having a circular optical fiber path 94, such as the spool tray 34 shown in FIG. 6A, it will be understood that the radius r of the circular optical fiber path 94 should at least reach the critical radius, and preferably exceed it by a safety margin. This poses a practical limitation to reducing the diameter of the spool tray 34 past a certain extent, and therefore limits the practical minimum for the size of the tray locations.

In this particular example, for instance, the dimension of the tray locations was engineered to allow designing trays which provide optical fiber paths for a standard single-mode optical fiber having a 125 µm diameter cladding, and for channelling laser wavelengths in the infrared spectrum, say between 1 µm and 1.6 µm. The critical radius in such a scenario can be around 25 mm. Adapting the trays to this type of fiber would lead to a minimum of 50 mm diameter for the spools.

In this embodiment, given the practical limitations described above, it was decided to size the square tray locations 32 to have edges having 75 mm in length. This allowed both to accommodate the critical radius of curvature in the spools, and to accommodate the size of other optical components in other types of trays. It will be understood that in alternate embodiments, the tray locations can have other dimensions. For instance, an 80 µm diameter cladding single-mode optical fiber can have a smaller critical radius. It would be difficult to imagine, however, how the length of the edges of square tray locations could be reduced to below 25 mm, unless spool trays were split into four and provided in the form of four corner trays, in which case it is possible to imagine a tray location size of 12.5 mm, for instance, which could accommodate a corner tray without being below the critical radius of curvature at any point along the 90° arc, for some applications.

However, other unitary tray types can pose additional limitations to miniaturizing the tray locations. For instance, larger tray locations can allow some types of trays, such as the fiber optic component tray, for instance, to receive larger fiber optic components, and therefore achieve a greater degree of versatility. In the embodiment described above and illustrated, a satisfactory versatility of all unitary tray components 34, 36, 38, 40 was achieved with the square tray locations having a 75 mm edge.

Still referring to FIG. 4, In this particular embodiment, all the tray locations 32 have the same tray attachment 130 which includes four threaded bores 132 machined into the sheet-like body 50 of the fiber optic breadboard 16. All the unitary fiber optic trays 34, 36, 38, 40 also have a corresponding pattern of four corresponding bores 134 (see FIG. 6B), through which screws can be inserted and fastened into the threaded bores 132 of the tray locations 32. This is made possible in this embodiment because the body 50 of the fiber optic breadboard 16 is made of sheet metal in this case. In this embodiment, the four threaded holes 132 are also positioned in a symmetrical manner, such that any tray location 32 can accommodate the trays 34, 36, 38, 40 in any orientation. This latter feature is optional. In alternate embodiments, tray locations 32 can be provided with tray attachments 130 in the form of posts which protrude outwardly from the fiber optic breadboard 16, and the fiber optic trays be provided with complementary apertures or edges to snap into engagement with the posts, which would be especially practical for a fiber optic breadboard application where the body would be moulded of plastic. In still other applications, the tray attachments 130 can simply be portions of the tray locations on the surface of the fiber optic breadboard which are adapted in shape to corresponding portions of the rear face of the trays, to allow adhering the trays to the tray locations. In this embodiment, the face of the trays which is assembled to the face of the fiber optic breadboard, and the face of the fiber optic breadboard, are flat. In alternate embodiments, the surfaces can be provided with a mating shape V-grooved shape for instance, or another form of engineered ruggedness, to assist in providing a firm adhesive bond, for instance.

In this embodiment, the shape of the tray locations 32 is square. This was found advantageous given that it provides a symmetry of rotation of 90°, allowing the corresponding unitary trays 34, 36, 38, 40 to be assembled in any orientation, as long as the tray attachments are also adapted as it is the case in the illustrated example.

In alternate embodiments, an other rectangular shape can be used. Alternately, other shapes can be used. A hexagonal shape, for instance, is another possible polygonal shape which can form a regular tessellation. It is difficult to imagine how a triangular shape would work out, and this shape appears less interesting that the other regularly tesselatable shapes, even though it remains possible that a triangular shape may find uses in alternate embodiments. Moreover, even though an hexagonal shape is more appealing than a triangular one, there appears to be little motivation to use it over rectangular, since the rectangular shape has less edges, and therefore longer continuous edges, relative to its surface. Should an octogonal shaped tray be used, it can likely be assimilated to a square tray location. Other shapes than those referred to above could be used in alternate embodiments if deemed satisfactory.

Referring back to FIG. 4, it can be seen that the tray locations in this embodiment are also provided with apertures 136 defined across the sheet-like body 50 and having a shape in the form of tear drops which are oriented and located along coinciding edges 138 of adjacent tray locations 32. These tear drop shape apertures 136 can be particularly useful in conveying an optical fiber from one side of the fiber optic breadboard 16 to the other side, across the sheet-like body 50, as they are sized, positioned, and oriented in a manner which is adapted to receiving optical fiber from at least a given one of the optical fiber path portions of the trays 34, 36, 38, 40.

Figure 3:
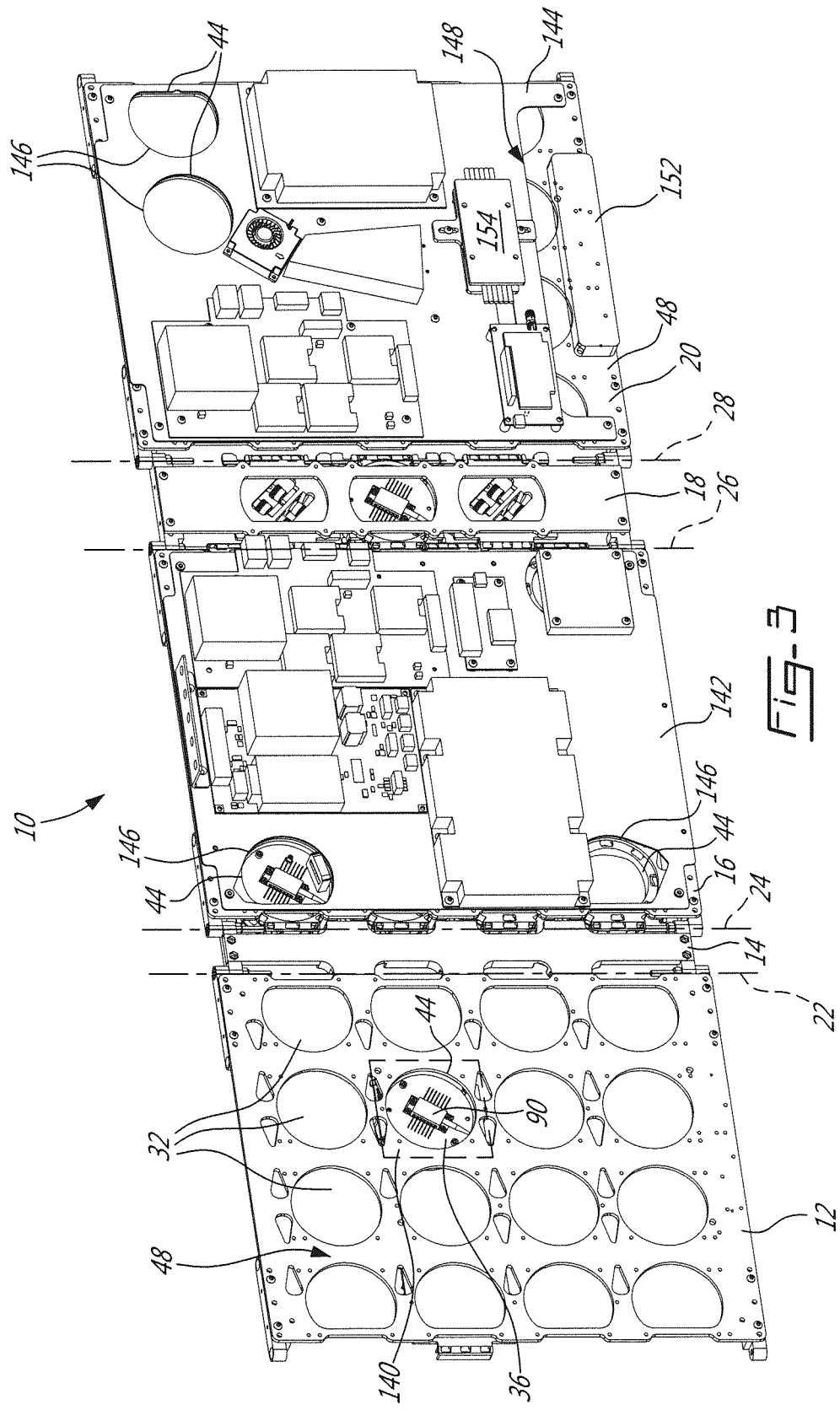
FIG. 3 is an oblique view showing the other face of the fiber optic assembly in the unfolded configuration.

Moreover, the tray locations 32 in this embodiment all include a main aperture 44 which extends through the sheet-like body. The main aperture 44 can be used to pass optical fiber, electronic connectors, or the like across the fiber optic breadboard 16, to name two examples. It can be especially useful when combined with a fiber optic tray having a corresponding circular aperture 88, such as the spool tray 34, or with a fiber optic tray which requires cooling or connection, such as the laser diode tray 36, for example. FIG. 3 shows an example of a tray location 140 on the fifth fiber optic breadboard 12, which receives a laser diode tray 36 on the other side of the fifth fiber optic breadboard 12. The laser diode 90 mounted below the heat sink is exposed across the fiber optic breadboard 12, through the aperture 44, and can readily be connected by electronics, for instance.

Still referring to FIG. 3, it can be seen that in this particular embodiment, all the electronic components are mounted on the second face 48 of the fiber optic assembly 10, to be accessible from a side thereof opposite the optics. More specifically, the electronics are all mounted to two electronic breadboards 142, 144 in this example, both having a sheet like body, which, in turn, are mounted to the first and third fiber optic breadboards 20, 16, respectively. A small gap, such as ⅛" for instance, is provided between the electronic breadboard 142, 144 and the fiber optic breadboard 16, 20 using spacers or the like, and can be used for conveying wires, for instance. Apertures 146 can be provided in the electronic breadboards 142, 144, and which can correspond to main apertures 44 of the fiber optic breadboards 16, 20 for instance, to facilitate passing wires or the like thereacross. The electronic breadboard 144 which is mounted to the first fiber optic breadboard 20 is provided with an elongated aperture 148 along the lower edge thereof, which corresponds to a portion 150 of the fiber optic breadboard 20 which extends past the tray locations 32 (see FIG. 2). This arrangement can be used to mount a modulator 152 directly to the second face of the first fiber optic breadboard 20, and readily connect the modulator 152 to a RF amplifier 154 positioned immediately adjacent thereto, but on the electronic breadboard 144, for instance.

In this embodiment, the ability of positioning the fiber optic components on one side of the fiber optic breadboard, and the electronics on the other, was considered advantageous. Since a lot of components have both electronics and fiber optics in some assemblies, as a rule of thumb, a component having a spliced connection was considered a fiber optic component in this example organization scheme.

As referred to above, optical fiber is a capricious material which requires special handling techniques. This is especially true when conveying an optical fiber across a hinge, such as can be required to change the configuration of the assembly 10 between the compact folded configuration shown in FIG. 1 in which the fiber optic assembly 10 is operated, and the deployed configuration shown in FIG. 2 in which the fiber optic assembly 10 can be assembled, disassembled, modified, troubleshooted or the like. To achieve the conveying of an optical fiber across a hinge, the portion of the optical fiber which is located between two adjacent fiber optic breadboards should be maintained parallel to the hinge axis, and should also be kept in coincidence with the hinge as closely as practical.

Figure 11:
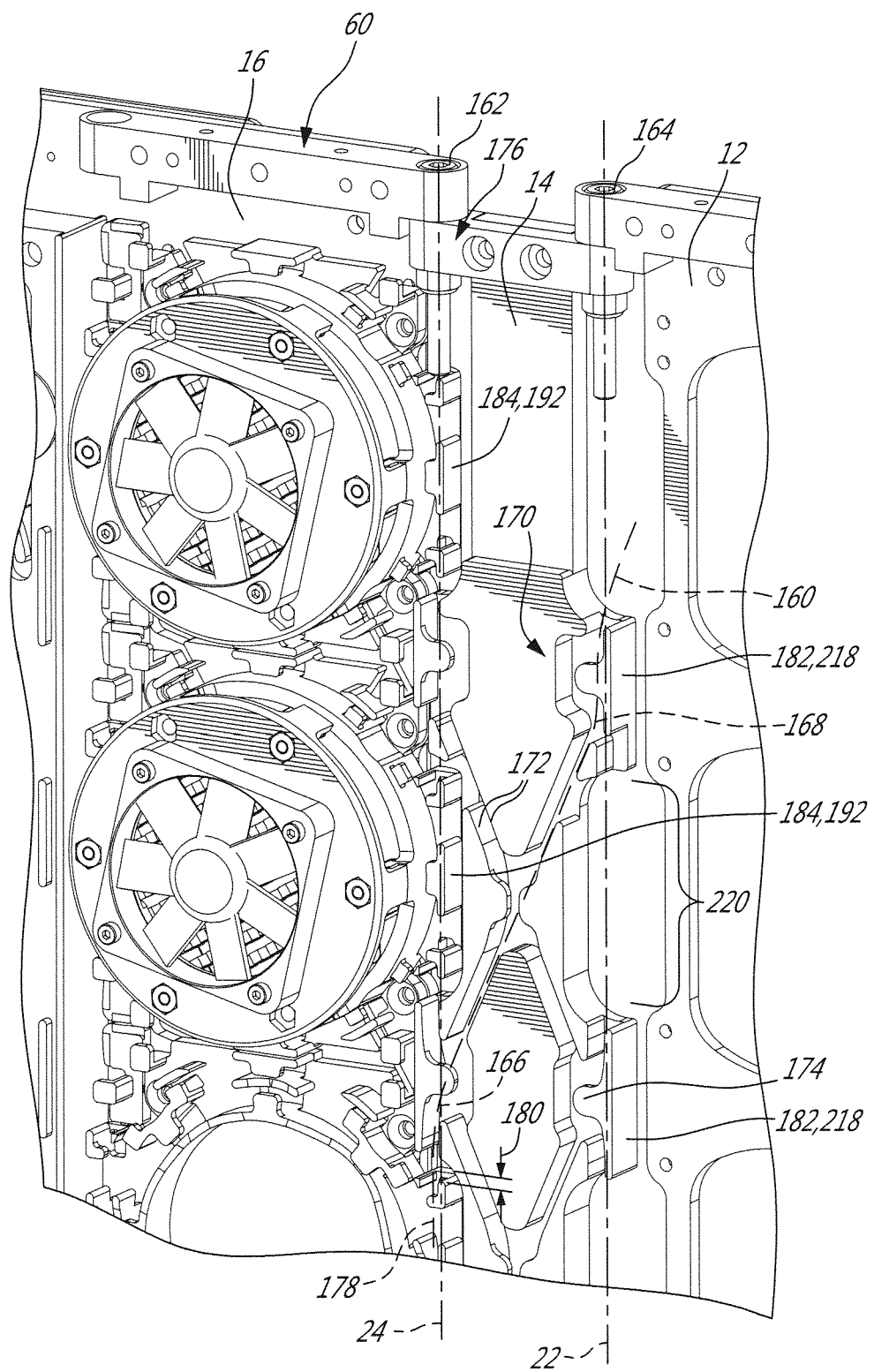
FIG. 11 is an oblique view, enlarged, showing a portion of the fiber optic assembly identified by lines 11-11 in FIG. 2.

In the embodiment shown in FIG. 5, an enlarged view thereof being provided in FIG. 11, an optical fiber can be conveyed along an optical fiber path 160 which extends from one fiber optic breadboard 16 to another fiber optic breadboard 12 via an intermediate fiber optic breadboard 14 successively across two hinges 162, 164 having associated axes 24, 22. More specifically, the optical fiber path 160 extends from a first portion 166 corresponding to a first one of the hinge axes 24, in which first portion 166 the optical fiber path 160 is parallel to and coincides with the first hinge axis 24. From the first portion 166, the optical fiber path 160 extends across the intermediate fiber optic breadboard 14, to reach a second portion 168 in which the optical fiber path 160 is parallel to and coincides with the second hinge axis 22. Along the entire optical fiber path 160, the radius of curvature remains above the critical radius.

In this specific example, the intermediate fiber optic breadboard 14 includes structure forming a plurality of paths which extend between the hinge axes 24, 22. In the case of the intermediate fiber optic breadboard 14 in this example, these paths are provided by a permanent structure 170 having walls 172 which protrude outwardly from a base thereof forming channels, and some tabs 174 are provided prevent the optical fiber from exiting the optical fiber path in the absence of manual intervention. It can also be seen on FIG. 11 how the header of one fiber optic breadboard 16 can be hingedly connected to the header 176 of an adjacent fiber optic breadboard 14 to form a hinge using a threaded fastener, for example. Footers are connected in a similar manner to the headers 60, 176 in this case.

To pass optical fiber onto an adjacent fiber optic breadboard 16, the optical fiber should be received on the adjacent fiber optic breadboard 16 along an optical path portion 178 which also coincides with the corresponding hinge axis. Moreover, components can be engineered in a manner that the section of the optical fiber which extends across an unconstrained section or gap 180 between the two fiber optic breadboards 14, 16 be as short as possible and remain as closely as practical in coincidence with the hinge axis 24. Henceforth, similarly, the third fiber optic breadboard 16 also has a portion of the optical fiber path 178 which is parallel to and in coincidence with the hinge axis 24, and this portion 178 is immediately adjacent the corresponding portion 166 of the fourth fiber optic breadboard 14 along the hinge axis 24. In the third fiber optic breadboard 16, the optical fiber is confined in this manner by a corresponding portion of a temporary structure formed by a fiber optic tray, and more particularly by the structure of the spool tray 34 which forms the straight optical path 74 along a lateral edge thereof, as was detailed above. Once across the gap 180 and on the spool tray 34, the optical fiber can extend from the straight path portion 74, onto the circular path 86, and thence leave circular path 86 tangentially along any one of the other straight paths 92, 76, 82, 84, to extend to an adjacent tray.

As will be understood from the above, the passage of the fiber from one fiber optic breadboard to another is basically managed by positioning for each one of the two fiber optic breadboards 14, 16, a structure which provides a straight optical fiber path portion 166, 178 coinciding with the hinge axis 24 adjacent, and in extension of, a corresponding structure in the other one of the fiber optic breadboards 14, 16. Henceforth, in this embodiment, to allow for a plurality of optical fiber paths bridging the two fiber optic breadboards 14, 16, each one of the two fiber optic breadboards 14, 16 has, in the plane of the structure, a plurality of laterally protruding edge portions 182, 184, each having a straight optical fiber path portion coinciding with the hinge axis, and these laterally protruding edge portions 182, 184 are interspaced from one another by a distance corresponding to their length along the hinge axis 24 (as best seen in FIG. 5), forming corresponding recesses (e.g. 190) between laterally protruding edge portions (184) of a same fiber optic breadboard (16) into which corresponding ones of the laterally protruding edge portions (182) of the other one of the fiber optic breadboards (14) extend, forming an interspersed configuration of adjacent protruding edge portions 184, 182 alternating between the two hinged fiber optic breadboards 14, 16.

To achieve a fiber optic tray destined for a square or rectangular tray location, having a protruding edge portion shape suitable for use in a fiber optic hinge such as described above, the protruding edge portion can be provided in a generally rectangular shape and extend laterally from the base of the fiber optic tray. An example of a tray having this such a protruding edge portion 192 is shown in FIGS. 8A and 8B, where the generally rectangular shape 194 is flanked, on each side along the corresponding edge 76, by two recesses 196, 198 each having half the length I of the protruding edge portion 192 to accommodate half of a protruding edge portion 192 of another tray across the hinge.

However, when using the same fiber optic tray (e.g. 38) at a location other than along a hinge, at a specific location in the tessellation 30 of square tray locations 32, the recesses 196, 198 can represent a significant gap when conveying an optical fiber straight between two adjacent fiber optic trays.

To this end, in the illustrated embodiment, the unitary fiber optic trays 34, 36, 38, 40 are provided with detachable portions 200, 202, 204, 206 (see FIG. 9A, 9B) which correspond to the recesses (e.g. 196, 198 shown in FIGS. 8A and 8B) desired when using the fiber optic tray to form a portion of a fiber optic hinge.

In this embodiment, the detachable portions 200, 202, 204, 206 include a portion of the structure 68 in the form of one or more walls 208, which is even provided with a tab 210 protruding laterally from a tip thereof in the illustrated embodiments. This portion of the structure 68 allows to confine the optical fiber within the optical fiber path (72 or 74) with a much smaller gap when extending the optical fiber between adjacent fiber optic trays in the planar tessellation.

On the other hand, if it is desired to use the fiber optic tray 40 (FIGS. 9A, 9B) in a hinge configuration, two of the detachable portions 200, 202, 204, 206 can be broken off to provide an appropriate recess 196, 198 allowing to intermesh therewith protruding edge portions 192 of the other hinged fiber optic breadboard. In the embodiment shown in FIGS. 8A and 8B, the recesses 196, 198 shown were not permanent, the fiber optic tray being simply illustrated with two corresponding detachable portions missing, i.e. previously broken off.

In the embodiment described above and illustrated, it will be noted that the protruding edge portions 192 extend centrally between two recesses 196, 198 having equal lengthwise dimensions along the edge, and that corresponding protruding edge portions 218, and recesses 220 of the fiber optic breadboard 14 are shaped to mate with the recesses 196, 198 and protruding edge portions 192 of the fiber optic trays, respectively. It will be understood that alternate embodiments can have recesses which do not have equal lengthwise dimensions, one being larger than the other, or even recesses provided only on one side of the protruding edge portion. Still alternately, the protruding edge portion can be separated into two halves in alternate embodiments, with the recess extending therebetween, to provide another example.

In the embodiments illustrated, the detachable edge portions 206, 204, 202, 200 are provided on both lateral edges 76, 78 of the fiber optic trays, to provide symmetry, though it will be understood that this is optional and that in alternate embodiments, the detachable edge portions can be provided on only a single edge, or even provided for all edges, for instance.

Referring back to FIG. 2 and FIG. 5, it can be seen that the illustrated fiber optic assembly includes a total of five fiber optic breadboards 12, 14, 16, 18, 20 sequentially hinged to one another. An optical hinge connection between the second fiber optic breadboard 18 and the third fiber optic breadboard 16 being provided entirely by the removable structure provided on the detachable trays on both breadboards 18, 16, but in a similar manner as that which was described above.

In this embodiment, the fiber optic assembly 10 is engineered to be foldable into an 'S' shaped configuration such as shown in FIG. 1. The second fiber optic breadboard 18 was selected to have a lateral dimension, i.e. width, corresponding to a single one of the tray locations 32. The fiber optic breadboard 18 can thus be said to have a 1×3 array of tray locations 32, rather than the 4×4 array of tray locations 32 such as the fiber optic breadboards 12, 16 and 20 in the hinge sequence. The fourth fiber optic breadboard 14 is the one which has the smallest width. In this particular embodiment, it was selected to have exactly half the width of the second fiber optic breadboard 18, and is provided with permanent optical fiber path structure rather than removable, modular optical fiber path structure. Nonetheless, its width was found satisfactory in this embodiment because it was sufficient to allow to clear the thickness of components located between the fifth fiber optic breadboard 12 and the third fiber optic breadboard 16 once folded. The width of the second fiber optic breadboard 18 allowing for a greater thickness of components between the first fiber optic breadboard 20 and the third fiber optic breadboard 16. Widths, and other dimensions, can vary in alternate embodiments.

As can be seen therefore, the examples described above and illustrated are intended to be exemplary only. Other embodiments are possible. For instance, although the fiber optic breadboards have only lateral hinge in this embodiment, alternate embodiments could also have upper and lower hinges, for instance, of the fiber optic assembly can be folded into another configuration than a S configuration, to name a few examples. Henceforth, the scope is indicated by the appended claims.

What is claimed is:

1. A fiber optic assembly comprising:
   at least one fiber optic breadboard having a body in the form of a sheet having a first face opposite a second face, at least the first face having a tessellation of tray locations, said tray locations each having
      a same polygonal shape having a plurality of edges, at least one of the edges of each tray location coinciding at least partially with an edge of an adjacent one of the tray locations,
      a same size, and
      a tray attachment; and
   a plurality of fiber optic trays each having a size and shape associated to one of
      a single one of said tray locations and
      a plurality of adjacent ones of said tray locations,
   said fiber optic trays including a first fiber optic tray and a second fiber optic tray attached adjacent to each other at corresponding tray locations via corresponding ones of said tray attachments and having at least one optical fiber path extending from the first fiber optic tray and the second fiber optic tray, each fiber optic tray having a structure forming a corresponding portion of said at least one optical fiber path, by which an optical fiber having a critical radius of curvature can be confined within said at least one optical fiber path, said at least one optical fiber path having a radius of curvature which remains above the critical radius of curvature along an entire length of the at least one optical fiber path.

2. The fiber optic assembly of claim 1 further comprising an electronic breadboard in the form of a sheet having a first face and a second face, the electronic breadboard being mounted to the second face of the fiber optic breadboard, opposite the fiber optic trays, with a spacing provided between the electronic breadboard and the fiber optic breadboard, and with the first face of the electronic breadboard facing the second face of the fiber optic breadboard, and having at least one electronic component mounted to the second face of the electronic breadboard.

3. The fiber optic assembly of claim 2 wherein at least one of the first and second fiber optic trays includes an optical component connected to said at least one electronic component via a wire which extends inside the gap and across an aperture defined through the fiber optic breadboard sheet within a corresponding tray location.

4. The fiber optic assembly of claim 2 further comprising an optical modulator mounted to the second face of the fiber optic breadboard.

5. The fiber optic assembly of claim 1 wherein the fiber optic trays have a base which is complementary to the tray attachments and is received thereon when a fiber optic tray is mounted to a corresponding tray location.

6. The fiber optic assembly of claim 5 wherein a plurality of said tray locations include a main aperture defined through the sheet of the fiber optic breadboard, at least one of said first fiber optic tray and said second fiber optic tray having a laser diode mounted to the base, the diode being electronically connectable through the fiber optic breadboard across the corresponding main aperture.

7. The fiber optic assembly of claim 1 wherein the fiber optic breadboard includes a plurality of tear drop shaped apertures defined through the sheet of the fiber optic breadboard, wherein a location and orientation of the tear drop shaped apertures corresponds to respective edges of the tray locations.

8. The fiber optic assembly of claim 1 wherein the structure includes a plurality of walls each protruding normal from said face and forming a transversal limit to said optical fiber path.

9. The fiber optic assembly of claim 8 wherein at least some of the walls further include tabs projecting laterally from tips thereof and forming an outer limit to said optical fiber path.

10. The fiber optic assembly of claim 1 wherein the structure includes a component attachment for securing a fiber optic component with an associated optical fiber thereof held in a specific orientation corresponding to an optical fiber path.

11. The fiber optic assembly of claim 1 wherein the same polygonal shape is a rectangle.

12. The fiber optic assembly of claim 11 wherein the rectangle is a square.

13. The fiber optic assembly of claim 1 wherein the tessellation is a regular two-dimensional array of said same polygonal shape.

14. The fiber optic assembly of claim 1 wherein said edges each have a dimension of at least 12.5 mm.

15. The fiber optic assembly of claim 14, wherein said edges each have a dimension of at least 25 mm.

16. The fiber optic assembly of claim 15, wherein said edges each have a dimension of at least 50 mm.

17. The fiber optic assembly of claim 1 wherein at least two of the edges of each tray location coincides fully with one of the edges of an adjacent one of the tray locations.

18. The fiber optic assembly of claim 1 wherein each of said tray attachments includes a plurality of threaded bores.

19. The fiber optic assembly of claim 18 wherein the position of the threaded bores is repeated in the tessellation.

20. The fiber optic assembly of claim 1 wherein said fiber optic assembly includes at least two of said at least one breadboard, and two of said at least two breadboards being hinged to one another to pivot relatively around a common hinge axis, the hinge axis being parallel to an edge of at least one of said fiber optic tray locations on each one of said two breadboards, each of said two fiber optic breadboards having at least one fiber optic tray having an optical fiber path portion extending parallel and coinciding with the hinge axis, and being immediately adjacent and extending into an optical fiber path portion of a fiber optic tray on the other one of the two fiber optic breadboards.

21. The fiber optic assembly of claim 20 wherein each of said two fiber optic breadboards have a plurality of said at least one fiber optic tray having an optical fiber path portion extending parallel and coinciding with the hinge axis, each of said path portion extending parallel and coinciding with the hinge axis being positioned on a laterally protruding edge portion of a corresponding fiber optic tray, the plurality of laterally protruding edge portions being regularly interspaced from one another along the common hinge axis by a distance having a dimension at least equal to the same length of the laterally protruding edge portions, forming corresponding recesses between laterally protruding edge portions, the laterally protruding edge portions of each of said two fiber optic breadboards being engaged with the recesses of the other one of said two fiber optic breadboards to form communicating portions of the optical fiber path along the common hinge axis and providing clearance upon pivoting of the two fiber optic breadboards relative to one another about the common hinge axis.

22. The fiber optic assembly of claim 21 wherein the recesses are provided in the form of two rectangular shaped absent portions of the tray, each coinciding with a corner of a corresponding tray location, the laterally protruding edge portions protruding between the two rectangular shaped absent portions; and wherein the plurality of trays on a first one of the two fiber optic breadboards is offset with the plurality of trays on a second one of the two fiber optic breadboards for the laterally protruding edge portions to intermesh with the recesses.

* * * * *